US011005983B1

(12) United States Patent
Koh

(10) Patent No.: US 11,005,983 B1
(45) Date of Patent: May 11, 2021

(54) THIN MOBILE AND WEARABLE DEVICES

(71) Applicant: Wei Hu Koh, Irvine, CA (US)

(72) Inventor: Wei Hu Koh, Irvine, CA (US)

( * ) Notice: Subject to any disclaimer, the term of this patent is extended or adjusted under 35 U.S.C. 154(b) by 0 days.

(21) Appl. No.: 16/435,159

(22) Filed: Jun. 7, 2019

(51) Int. Cl.
   *G06F 1/16* (2006.01)
   *H04M 1/02* (2006.01)

(52) U.S. Cl.
   CPC .......... *H04M 1/0268* (2013.01); *G06F 1/163* (2013.01); *G06F 1/1652* (2013.01); *H04M 1/0262* (2013.01)

(58) Field of Classification Search
   CPC ... H04M 1/0268; H04M 1/0262; G06F 1/163; G06F 1/1652
   See application file for complete search history.

(56) References Cited

U.S. PATENT DOCUMENTS

| | | | |
|---|---|---|---|
| 10,602,623 B1* | 3/2020 | Myers | G06F 3/147 |
| 2013/0265257 A1* | 10/2013 | Jung | G06F 3/0488 |
| | | | 345/173 |
| 2015/0378391 A1* | 12/2015 | Huitema | G09F 21/02 |
| | | | 361/679.03 |
| 2016/0282899 A1* | 9/2016 | Inagaki | H04B 5/0037 |
| 2016/0284236 A1* | 9/2016 | Bavunoglu | G06F 3/014 |
| 2019/0053739 A1* | 2/2019 | Inoue | G06Q 40/02 |

* cited by examiner

*Primary Examiner* — Michael C Zarroli

(57) ABSTRACT

A wearable electronics device having a removable thin top touchscreen that is interchangeable to other touchscreens having different sizes and shapes to convert the device form factor and functions from a fitness-tracker to a smartwatch or a handheld smartphone, using an applications processor in the underlying electronics housing unit capable of running the device in various form factors. The smartphone touchscreen further provides additional power and memory/storage for smartphone-level functions and performance.

11 Claims, 7 Drawing Sheets

THIN MOBILE AND WEARABLE DEVICES

BACKGROUND OF THE INVENTION

1. Field of the Invention

This relates generally to handheld and wearable mobile phone devices such as cellphones, smartphones, fitness-trackers and smartwatches having touchscreens for wireless communications.

2. Description of the Related Art

Smartphones have evolved to become a complex communication and computing tool that performs multiple tasks including navigation, high-quality photography, and health-monitoring. However, with increased functions came with more device weight and bigger screen size, as more sensors and components such as MEMS accelerometers, GPS, as well as digital camera module (DCM) with multiple lenses, are included. As a result, many smartphones have become too big and too heavy for one-hand operation; frequent battery-recharging is also needed due to high power consumption rates. Further, the cost of many flagship smartphones can easily exceed one-thousand US dollar ($1000), out of reach for many ordinary users who desire to use only simple calling and texting features from an uncomplicated, smaller mobile handset that is affordable and light-weight.

As a secondary or auxiliary mobile phone device, wrist-wearable smartwatches or bendable cellphones are available. Such devices are often expensive, quite thick, bulky, and limited in display screen size. A thin, wearable cellphone device having a display larger than a typical watch and does not require frequent recharge is desired.

Many smartphones have the function for health monitoring like a wrist-worn fitness-tracker or a smartwatch. During exercises such as running or workout, however, a large handheld smartphone is cumbersome to wear on a person's arm or wrist. People typically wear a smartwatch or a fitness-tracker band in addition to having a smartphone stored somewhere nearby during workout. It would be much more convenient and desirable if a wrist-worn fitness-tracker wristband can be converted to a smartwatch or even a thin mini-handheld smartphone for different occasions, thus replacing three different wearable and mobile devices by one single, three-in-one wearable and handheld device that remains thin and lightweight.

SUMMARY OF THE INVENTION

A wrist-worn fitness tracker device having a thin, removable touchscreen attached on one side to a slat housing containing minimal but essential functional components for mobile calling, texting, and Bluetooth/Wi-Fi connections. The thin touchscreen may be made from LCD, AMOLED, or thin film micro-LED and has a form factor of narrow fitness-tracker screen. Additional interchangeable screens, however, can have the form factors of various sized larger smartwatch screens, or a rectangular hand-held smartphone screen. All essential electronic components such as CPU, memory/storage, RF front-end modules, sensors, drivers, and power supply are inside the thin slat housing attached to the. When a thin smartphone-sized screen is attached, the device can be used as a secondary or auxiliary phone, so, it need not to have non-essential functions such as GPS navigation or video camera. Thus, unnecessary sensors and components are eliminated for thinness and light-weight. A digital camera module is not needed but can optionally be added for high-end models of these devices. However, with continued miniaturization and performance enhancement in electronics, even a relatively thin and small sized handheld smartphone screen can contain all usual functions including camera and health monitoring.

As a secondary or auxiliary mobile phone for quick, short usage, the device main functions are for wireless calling, texting, and internet connection via Wi-Fi or Bluetooth. No large-capacity battery is needed for prolonged talking or viewing; and expensive, high-performance, advanced application process SOC (System on Chip) or CPU is also unnecessary. With no need to store a large number of digital photos and files, memory storage capacity requirement is low, and 32-64 GB NAND flash storage memory maybe adequate. By choosing integrated SOC chipset and miniaturized IC packages such as SiP (System in Package) or modules, the number and sizes of components inside the thin slat are kept to a minimum for reduced footprint, thin thickness, light-weight, and less power consumption. The battery power required is similar to that of an electronic smartwatch or other wearable devices; a capacity of less than 400 mAh would suffice.

Optionally, when the attached smartphone screen contains additional booster power, more memories and storage, and digital camera modules, the original wrist-worn fitness-tracker or smart watch is converted into a full-fledged functional smartphone; and its wristband may be removed to turn the device into a true handheld. The original Application Process Unit (APU) processor inside the fitness-tracker housing should have the capability of running smartphone functions; otherwise, a second, smartphone APU may be necessary inside the attached smartphone screen.

At least one mini- or micro-connector socket is disposed on top of the electronics housing unit for electrical interconnection to the attached touchscreen; additional pogo pins or clip-on springs may be used to further strengthening and securing the coupling between the touchscreen and the underlying electronics housing unit. The APU, sensors, electric components, RF modules, DRAM memory, NAND flash storage, and a battery pack necessary to run the device as both a fitness-tracker and a smartwatch are contained inside the electronics housing unit. The electronics housing unit is integrated to a curved or slanted extension bridge on each end for connection to a hinged and detachable wristband.

A digital crown spinning control button typically found on the sidewall of a wristwatch is located on the top side of one extension bridge not covered by the touchscreen, so that the digital crown can be operated using fingers under all three different device form factors. The digital crown can be used as the home button; it can also be used to unlock of the attached touchscreen for decoupling through built-in operating systems software and firmware.

In the handheld smartphone form factor, the touchscreen dimensions are preferably similar to that of a mini-handheld, around 4-inches. The touchscreen may remain thin so that the device is like a butterfly having an extended wingspan on each side. Preferably, however, the touchscreen has the same thickness as the electronics housing unit and a center cavity enclosing the electronic housing unit so that the coupled handheld device has a flat bottom like a tablet.

Because a smartphone requires more capable electronics and more memory and storage, the handheld-sized touchscreen serves a double duty by providing additional battery packs and boosting electronics underneath the touchscreen display to enable the APU inside the electronics housing unit to perform at smartphone level. The wristband connected to the housing unit may remain attached so that the mini-smartphone can still be worn on a person's arm or wrist, or it can be removed to render the handheld device into a tablet-like smartphone.

BRIEF DESCRIPTION OF THE DRAWINGS

FIG. 7 is a perspective view of the backside of a handheld touchscreen unit having a battery pack compartment and an electronics compartment with a center cavity in-between.

DETAILED DESCRIPTION

A wrist-worn fitness-tacker device with a housing unit containing sensors and electronics capable for both health-monitoring and smartwatch functions has a removable and interchangeable touchscreen display coupled on top, using connector sockets and insertion pins or clip-on springs. When a narrow, rectangular touchscreen is attached to the housing unit, the device has the form factor and functions of a wrist-worn fitness-tracker; when a slightly larger touchscreen with either rectangular, round, or oblong shape is attached, the device turns into a smartwatch. When a larger, handheld-sized touchscreen is attached, the device is converted into a handheld smartphone with the detachable wristband removed. Optionally, the wristband may remain attached to render the smartphone device wearable on an arm or a wrist. In summary, a three-in-one modular device with removable and interchangeable touchscreens can function as either a fitness-tracker, a smartwatch, or a handheld smartphone. A digital crown spinning button located on top of an extension bridge integrated to the electronics housing unit stays clear from the perimeter of attached modular touchscreen to remain accessible by fingers for control operations of the device in all three form factors. A built-in application process unit (APU) inside the electronics housing unit is capable of supporting performance levels for a fitness-tracker, a smartwatch, and a smartphone.

Figure 1:
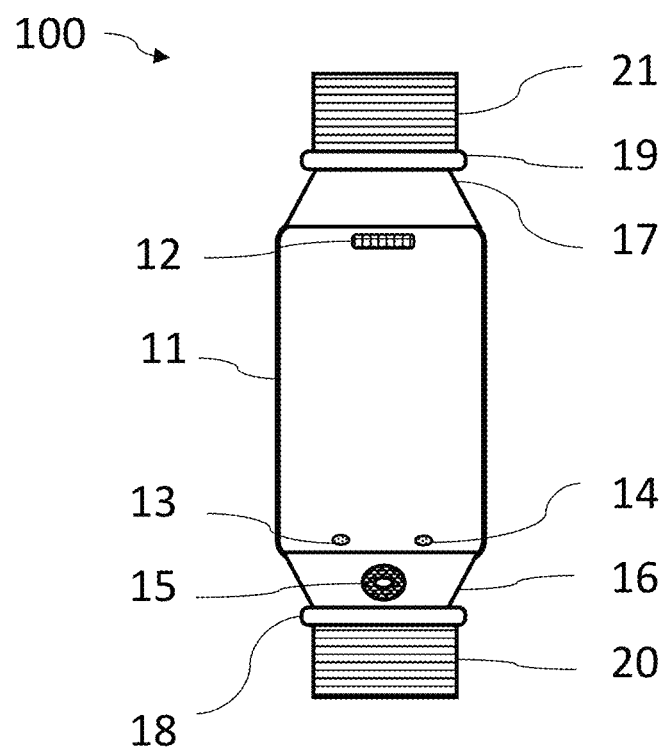
FIG. 1 shows the top view of a fitness-tracker device having an electronics housing unit without a top touchscreen. A pair of slanted extension bridges, one on each end of the housing unit, connects to a detachable, hinged wristband.

FIG. 1 illustrates the top view of a basic fitness-tracker wristband 100 with no touchscreen attached. A center electronics and sensor housing unit 11 has a slanted or curved extension bridge 17 integrated to top edge and a similar extension bridge 16 integrated to the lower edge. Extension bridge 16 is connected to detachable hinge 18 that is linked to wristband end-section 20, and extension bridge 17 is connected to detachable hinge 19 connected to wristband end-section 21. The exposed top surface of electronics housing unit 11 has a connector 12 and pogo pins 13 and 14 near the lower edge for insertion into the touchscreen backside. Alternatively, small clip-on springs (not shown) may replace the insertion pogo pins for mechanical coupling. Connector 12 can be a standard mini or micro electrical connector such as Apple lightening, USB type C, or custom-made contact pad connector for electrical connection to couple the touchscreen. Pogo pins 13 and 14 are used for insertion-locking of the coupled touchscreen; alternatively, clip-on springs may be utilized instead of pogo pins 13 and 14.

A digital crown spinning button 15 typically found on a smartwatch sidewall is disposed on the top surface of slanted extension bridge 16 to allow finger operation from the top of device 100 regardless of which touchscreen is attached to electrical housing unit 11.

Figure 2:
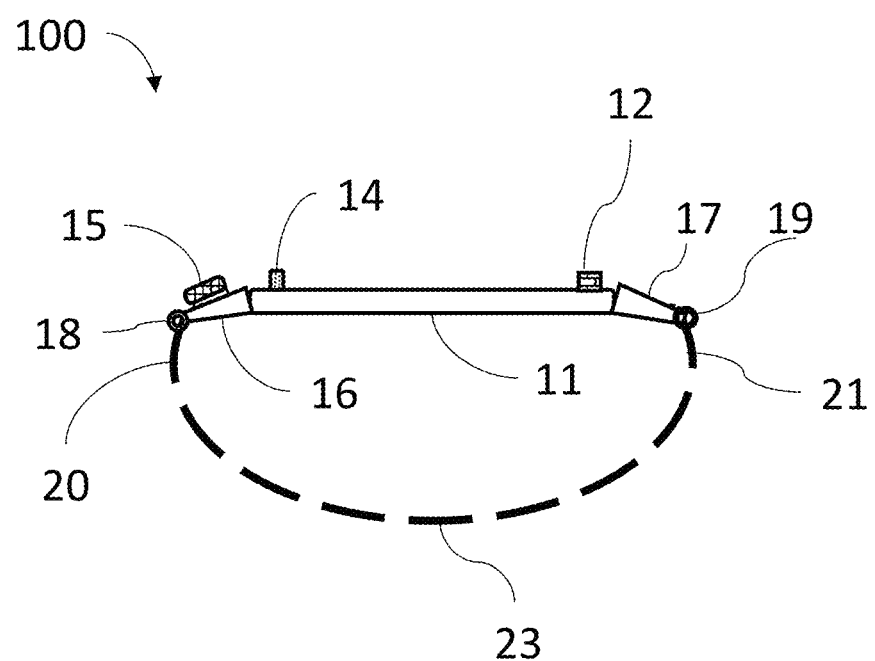
FIG. 2 illustrates the sideview of the fitness-tracker device having an electronics housing unit without a top touchscreen; a connector socket and an insertion pin are on the top surface of the housing unit; each end of the housing unit has an integrated and slanted extension bridge attached to a wristband hanging below.

To further illustrate the structure of device 100, FIG. 2 shows the sideview of device 100 without a touchscreen on top of electronics housing unit 11. A detachable hinge 19 at the end-section 21 of wristband 23 is connected to extension bridge 17; detachable hinge 18 at the other end-section 20 of wristband 23 is connected to extension bridge 16.

A connector 12 is shown protruding above housing unit 11 near the righthand edge, while a pogo pin 14 is shown near the left-hand edge of housing unit 11. Connector 12 is used for electrical interconnection between housing unit 11 and any of the modular interchangeable touchscreens to be mounted on top. Pogo pin 14 is used for position locking of the attached touchscreen. More than one insertion pins may be used for such purpose. However, if more than one electrical connector is used on top of housing unit 11, pogo pin 14 may not be needed. Connector 12 can be a standard connector such as USB type C socket, Apple lighting connector, or custom-made contact pads for electrical interconnection. Position-locking pin 14 can be a spring-loaded pogo pin or clip for insertion to a touchscreen.

A tilted digital crown spinning button 15 is shown on top of slanted extension bridge 16, away from the perimeter of any attached touchscreen so that digital crown 15 remains accessible to fingers for control operations. Digital crown 15 can be used as home button for device 100 and also to unlock the interchangeable modular touchscreen using built-in operating firmware system.

Housing unit 11 encloses all essential health monitoring sensors, electronic components, battery, power management module (PMIC), RF module, Application Process Unit (APU) chip, DRAM memory and NAND flash storage to provide fitness-tracker performance when a fitness-band type touchscreen is attached. When a smartwatch form factor touchscreen is attached, additional performance features are enabled and activated automatically for device 100 to perform like a smartwatch, because provisions for smartwatch level performance is already built-in in the electronics system and the APU inside electronics housing unit 11 of device 100.

Figure 3:
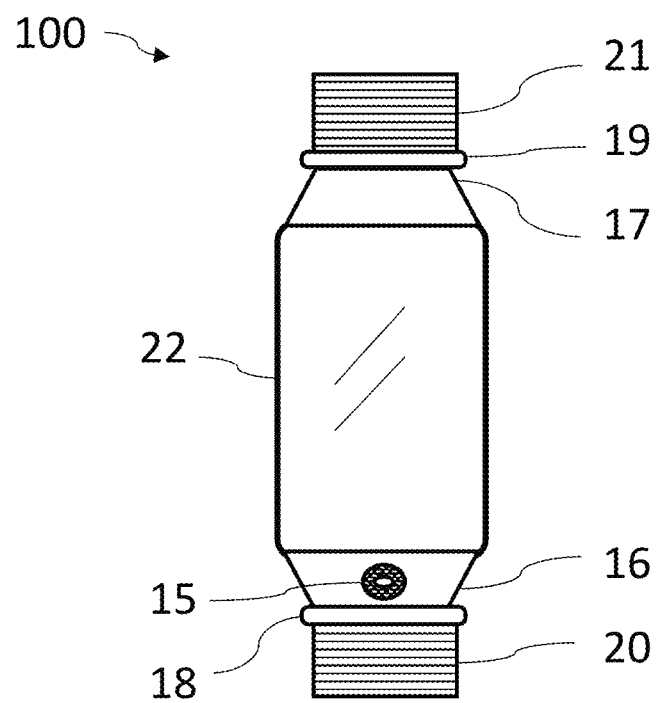
FIG. 3 shows the top view of a fitness-tacker device having a removable rectangular touchscreen attached on top of the electronics housing unit; a digital crown button on the extension bridge remains accessible by fingers.
Figure 4:
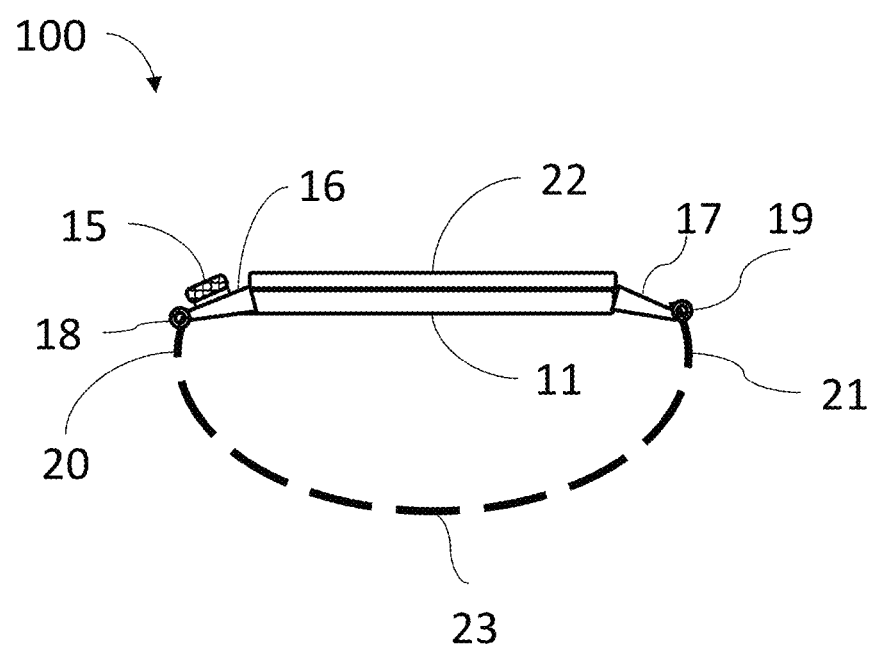
FIG. 4 illustrates the sideview of a fitness-tracker device with a top touchscreen coupled to the electronics housing unit underneath and connected to a hanging wristband. A digital crown button on extension bridge is accessible by fingers for operation.

FIG. 3 shows the top view of a fitness-tracker form factor device 100 having a rectangular touchscreen 22 on top; touchscreen 22 has the same size and shape as its underlying electronics housing unit. Digital crown 15 on extension bridge 16 serves as the home button for on-off switch and other functions, including unlocking of top touchscreen 22. Slanted extension bridge 17 is connected to wristband end-section 21 through hinge 19, and extension bridge 16 is connected to wristband end-section 20 through hinge 18. FIG. 4 illustrates the sideview of device 100 with touchscreen 22 on top of electronics housing unit 11. A loose, hanging wristband 23 is connected to housing bridges 16 through hinge 18 at end-section 20, and to extension bridge 17 at end-section 21 through hinge 19. Digital crown 15 on extension bridge 16 is tilted slightly and away from touchscreen 22 for operations by fingers.

Figure 5:
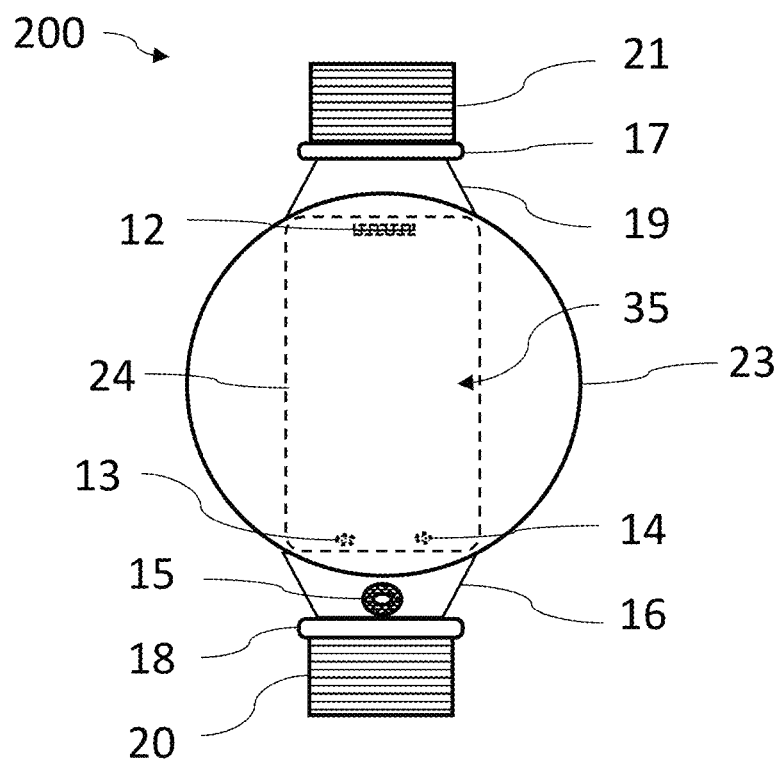
FIG. 5 shows the top view of a smartwatch form factor device having a removable round touchscreen on top of the electronics housing unit. A cavity on touchscreen underside, indicated by dashed line, is used for insertion onto the electronics housing unit underneath. A digital crown button located near the round touchscreen is accessible by fingers.

FIG. 5 illustrates the top view of a device 200 having a round-shaped smartwatch touchscreen display 23 mounted on top of the housing unit underneath. Dashed line 24 indicates the perimeter of a center cavity 35 on the underside of touchscreen 23; cavity 35 fits over the electronics housing unit underneath for touchscreen 23 for coupling on top of the electronics housing unit by connecting to connector 12. Dashed line circles 13 and 14 indicate two individual locking pins from the electronics housing unit underneath. Attaching touchscreen 23 to the electronics housing unit beneath automatically raises the internal CPU performance level of device 200 from fitness-tracker to that of a smartwatch, and spinning digital crown 15 is used for smartwatch control duties. Smartwatch touchscreen 23 is slightly larger in size than the underlying electronics housing unit, and may have different shapes such as round, square, rectangular, or oblong. Wristband end-section 20 is connected to extension bridge 16 through hinge 18, and wristband end-section 21 is connected to extension bridge 19 through hinge 17.

Figure 6:
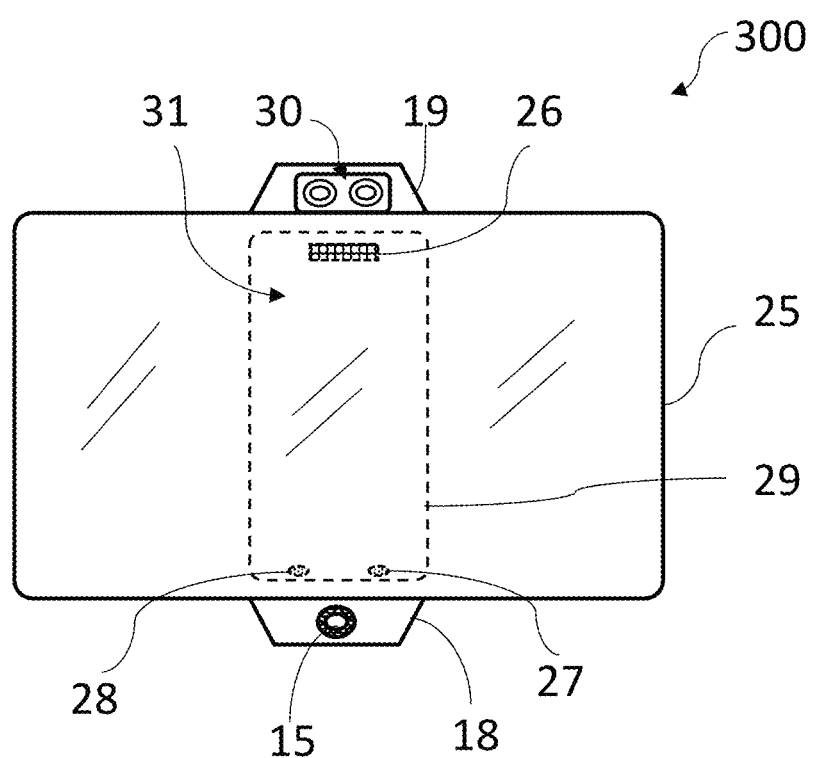
FIG. 6 shows the top view of a smartphone form factor device having a removable rectangular touchscreen attached on top of the electronics housing unit and the wristband removed from the extension bridges.

FIG. 6 shows the top view of a device 300 having a handheld-sized touchscreen 25 coupled on top of the electronics housing unit underneath; the wristband and its two end hinges are removed. Dashed line 29 indicate the perimeter of center cavity 31 on the underside of touchscreen 25 for insertion onto the electronics housing unit. Inside cavity 31, dashed line 26 indicates the connector used for electrical interconnection to electronics housing unit underneath; circles 27 and 28 indicate two separate insertion-locking pins or clip-on springs. However, if touchscreen 25 backside cavity 31 uses two or more electrical connectors, insertion pins 27 and 28 would not be needed.

On the top edge of touchscreen 25, a camera module 30 is attached to touchscreen sidewall above extension bridge 19 in device 300. Camera module 30 can be a permanent, integral part of touchscreen 25, a pop-up component, or an inserted component that may be removed from touchscreen 25. The top display on touchscreen 25 can be LCD, OLED, mini-LED, micro-LED, or other suitable displays. Digital crown 15 located on extension bridge 18 is used as the home button for control duties; it can also be used to unlock touchscreen 25 for removal.

Except for the application processor, the electronics systems inside the electronics housing unit in device 300 have power and capabilities to support a fitness-tracker and a smartwatch. For device 300 to function as a smartphone, additional reserve power capacity and function capabilities must be supplemented from battery packs and electronic systems inside touchscreen 25. Thus, to convert device 300 into a full-fledged smartphone, touchscreen 25 has necessary battery pack and electronics systems compartment underneath the display layer. The thickness of touchscreen 25 can still be thinner than that of the electronics housing unit, so that the cross-section of device 300 looks like a butterfly or an airplane with two wings. When a wristband is attached, the winged device 300 may still be worn on an arm or wrist for use as a wearable mini smartphone.

Preferably, however, the thickness of touchscreen 25 is made equal to that of the electronics housing unit underneath. After coupling the electronics housing unit onto touchscreen backside cavity 31, device 300 has the form factor of a flat-bottomed tablet, with wristband removed. device 300 is turned into a rectangular-shaped mini handheld.

Figure 7:
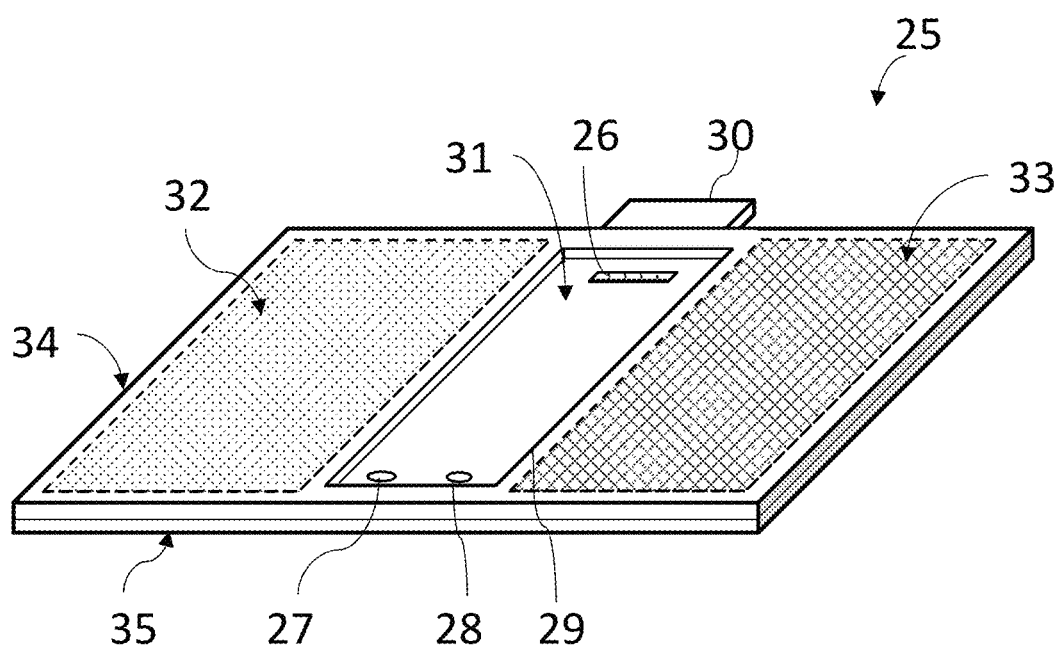

FIG. 7 illustrates the perspective view of a flipped-over touchscreen 25 with its underside 34 facing up and top display layer 35 facing down. A center cavity 31 defined by perimeter 29 is located in the middle of underside 34, containing a connector socket 26 for electrical interconnection and two insertion holes 27 and 28, respectively, for attaching pogo pins. To the right of cavity 31 is a thin compartment 33 containing additional electronics and memories for device 300 to perform as a smartphone; to the left of cavity 31 is a thin compartment 32 containing a thin battery pack for smartphone power supply needs, such as a 2500 mAh lithium battery, for example. Additional electronics systems inside compartment 33 may include GPS, DRAM memory, NAND flash, digital camera module, and other sensors and components typically used for a handheld device. FIG. 7 shows only one interconnection socket 26 inside cavity 31, but more than one connector may be used if needed. In the case when two or more connectors are used, mechanical insertion pins or clip-on springs for pin holes 27 and 28 may no longer be necessary.

When modular touchscreen 25 is flipped back to have display layer 35 facing up and underside layer 34 facing down, cavity 31 can be fitted onto the electronic housing unit and convert device 300 in FIG. 6 into a handheld smartphone. Upon coupling of touchscreen 25, the application processor inside the electronics housing unit is activated to perform at smartphone level instead of just a fitness-tracker or a smartwatch. The size of touchscreen 25 is preferably that of a mini handheld device, typically around 4-inches, so that device 300 may be used as a handheld device with wristband removed, or still as a wearable device with wristband attached. For device 300 to be used as a handheld, touchscreen 25 preferably has the same thickness as the electronics housing unit and the wristband is removed for ease of holding and handling. For device 300 to still be used as a wearable, a wristband can remain attached to the electronics housing unit extension bridges for wearing on an arm or wrist. Also, touchscreen 25 can have a thickness thinner than that of the electronics housing unit, like an extended wing on each side of the electronics housing unit such that a light-weight, thin device 300 may be easily worn on a person's wrist or the arm during excise.

The invention claimed is:
1. A wearable electronics device comprising:
 a housing unit having electronics systems, sensors, and power supply inside and a connector socket disposed on top for electrical connection to a removable touchscreen;
 a removable touchscreen having an underside connector receptacle for connection to said electronics housing unit;
 a main application processor unit inside the electronics housing unit capable of performing smartphone functions and health monitoring functions;

at least one insertion pin or clip-on spring disposed on top of said electronics housing unit for insertion-locking of the removable touchscreen;

a slanted extension bridge integrated to each end of the two ends of said electronics housing unit for connection to a detachable wristband through a removable hinge; and a digital crown button disposed on top of one extension bridge away from the perimeter of the removable touchscreen.

2. The wearable electronics device according to claim 1, wherein the attached removable touchscreen has the same size and shape as the underlying electronics housing unit to form a fitness-tracker.

3. The wearable electronics device according to claim 1, wherein the attached removable touchscreen is slightly bigger than the underlying electronics housing unit in size and has an underside cavity to clip onto the electronics housing unit to form a smartwatch.

4. The wearable electronics device according to claim 3, wherein the removable touchscreen underside cavity contains a connector receptacle and at least one insertion holes for locking onto the underlying electronics housing unit.

5. The wearable electronics device according to claim 1, wherein the attached removable touchscreen is rectangular and substantially larger than the electronic housing unit to form a handheld smartphone.

6. The wearable electronics device according to claim 5, wherein the removable touchscreen has a camera module connected to its sidewall.

7. The wearable electronics device according to claim 5, wherein the touchscreen backside has a compartment containing battery packs and electronics components for smartphone functions and performance.

8. The wearable electronics device according to claim 5, wherein the touchscreen backside has a cavity containing at least one connector receptacles for electrical connection and clip-on to underlying electronics housing unit.

9. The electronics device according to claim 5, wherein the wristband and its two end hinges are removed from electronics housing unit extension bridges.

10. The electronics device according to claim 8, wherein the rectangular smartphone touchscreen has a body thickness equal to the underlying electronics housing unit to form a flat-buttoned smartphone.

11. The electronics device according to claim 8, wherein the rectangular smartphone touchscreen has a body thickness thinner than the underlying electronics housing unit to form a smartphone with two thinner side wings.

* * * * *